Figure 1:
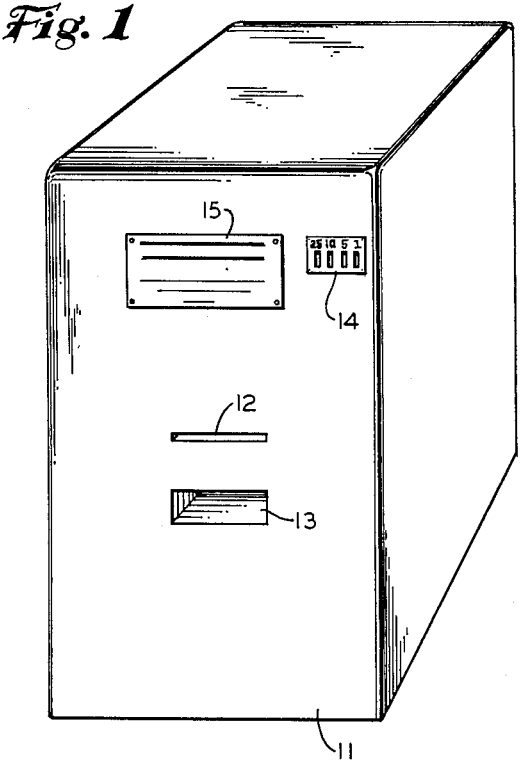

Feb. 26, 1963  L. G. SIMJIAN  3,079,603
DEPOSITORY MACHINE COMBINED WITH IMAGE RECORDING MEANS
Filed June 30, 1960  4 Sheets-Sheet 1

INVENTOR.
LUTHER G. SIMJIAN
BY Ervin B. Steinberg
AGENT

Feb. 26, 1963 L. G. SIMJIAN 3,079,603
DEPOSITORY MACHINE COMBINED WITH IMAGE RECORDING MEANS
Filed June 30, 1960 4 Sheets-Sheet 2

INVENTOR.
LUTHER G. SIMJIAN
BY
Ervin B. Steinberg
AGENT

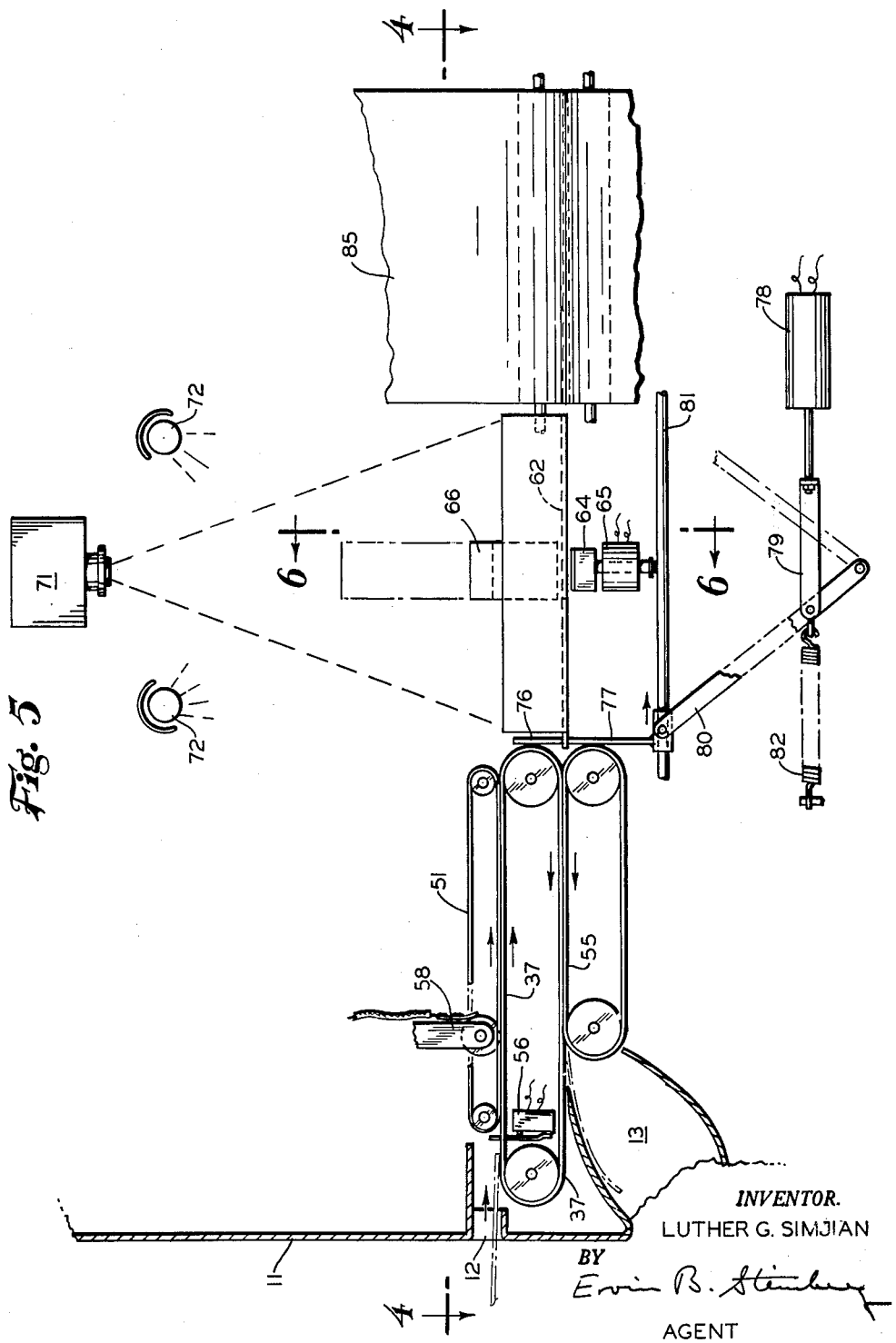

Feb. 26, 1963  L. G. SIMJIAN  3,079,603
DEPOSITORY MACHINE COMBINED WITH IMAGE RECORDING MEANS
Filed June 30, 1960  4 Sheets-Sheet 4
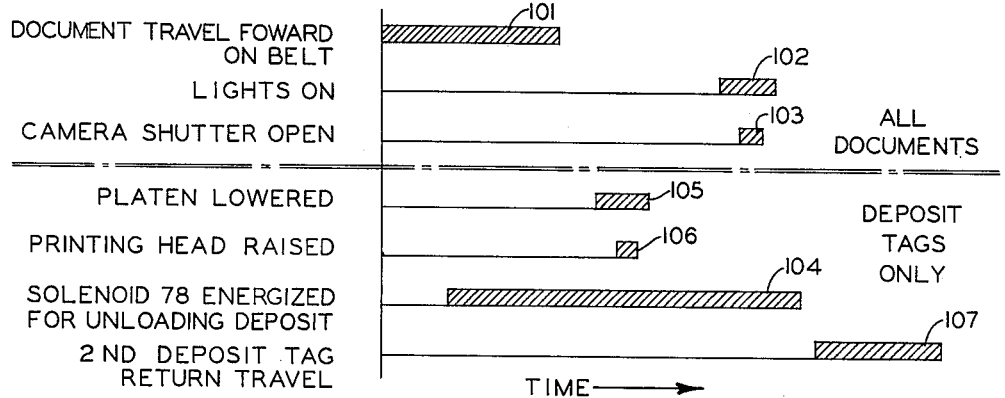
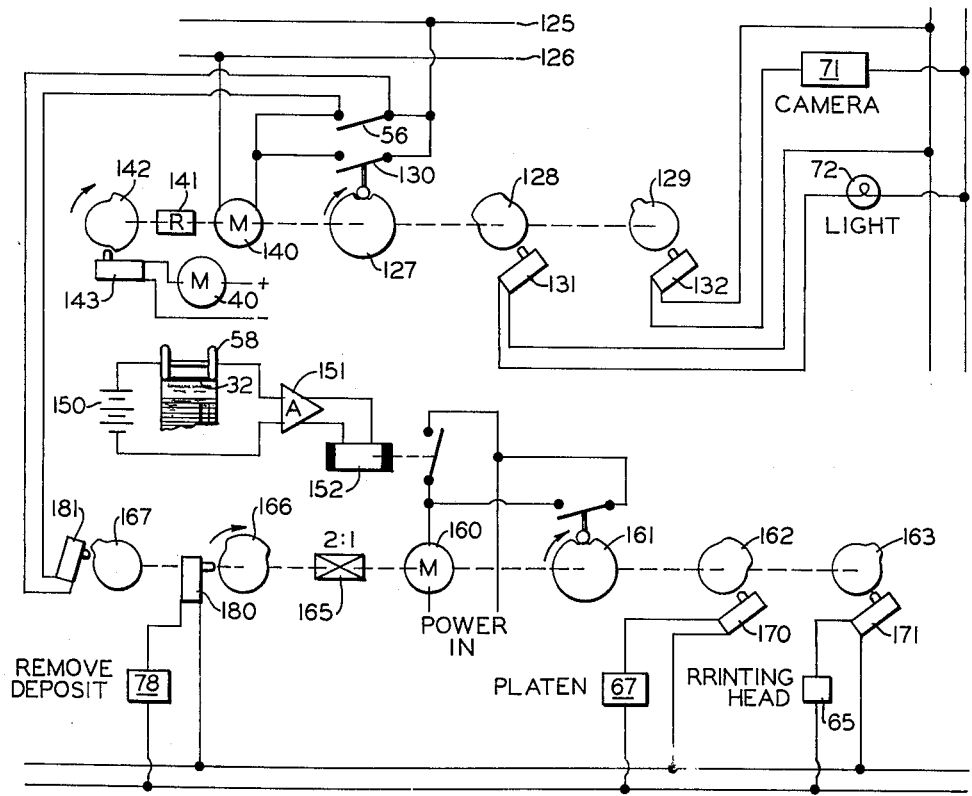
INVENTOR.
LUTHER G. SIMJIAN
BY Ervin B. Steinberg
AGENT

United States Patent Office 3,079,603
Patented Feb. 26, 1963

3,079,603
DEPOSITORY MACHINE COMBINED WITH IMAGE RECORDING MEANS
Luther G. Simjian, Greenwich, Conn., assignor to Universal Match Corporation, Ferguson, Mo., a corporation of Delaware
Filed June 30, 1960, Ser. No. 39,971
12 Claims. (Cl. 346—22)

This invention relates to depository machines and has particular reference to a depository machine combined with image recording means suitable for use in banks and other establishments where deposits are accomplished.

More particularly, this invention concerns a depository machine which receives sequentially articles for deposit and which is provided with validation means in order to validate a depositor prepared receipt. The validation means and the depository apparatus cooperate with image recording means in such a manner as to render a comprehensive record of the deposit transaction and to validate if desired, a plurality of deposit tags, one tag being returned to the depositor to serve as a receipt.

The ever-increasing activities of banks and similar financial institutions have given rise to the development and use of automatic equipment which replaces many of the operations heretofore accomplished manually. As an example, automatic check sorting and computing equipment, designed and developed recently, is coming into use in many banks. Consonant with this automation process there is the need for automatic deposit receiving equipment which is suitable for use by customers. Since the making of a deposit involves the handling of currency, such as paper bills and coins, checks and other negotiable or non-negotiable instruments, it is important that proper safeguards be provided to assure the existence of sufficient proof in the hands of the customer, as well as in the hands of the bank to resolve all discrepancies with utmost dispatch and finality. The machine described hereinafter has been designed with particular emphasis on providing such proof by incorporating image recording means and validating means to produce a documentary record of the deposit transaction. In particular, the machine is adapted to receive and feed in sequence articles in view of image recording means whereby the recording means become actuated to record on photographic film or similar material an image of each of the fed documents. Moreover, the depositor is requested to supply to the machine a set of deposit tags which itemize the various articles forming the deposit. By virtue of special provisions on the deposit tags and sensing means in the machine, the validation means become actuated whenever a deposit tag is received and effect validation of the tags while leaving undisturbed however, other articles, particularly currency. Upon completion of the deposit, one of the validated and recorded tags is returned to the depositor to serve as a receipt for the deposit.

One of the objects of this invention therefore, is the provision of a new and improved depository machine which avoids one or more of the limitations and disadvantages of prior art devices.

Another object of this invention is the provision of a depository machine combined with validation means and image recording means whereby the validation means are actuated only upon sensing a deposit tag and wherein the image recording means are actuated to provide documentary proof of each article received by the machine and of deposit tags subsequent to validation thereof.

Another object of this invention is the provision of a depository machine which receives sequentially a plurality of articles such as checks, paper bills and deposit tags, and which is provided with means adapted to discriminate between deposit tags and other items which form the deposit.

Still another object of this invention is the provision of a depository machine which includes means for sequential feeding of any quantity of deposit items and which records by means of image recording means all items of the deposit in associated identifiable relationship with a validated deposit tag.

A further object of this invention is the provision of a depository machine combined with validation and image recording means which accepts sequentially a first deposit tag, articles for deposit, and a second deposit tag and wherein the deposit tags become suitably validated and all items forming the deposit are photographed in the sequence received and wherein furthermore, the second deposit tag subsequent to its validation and image recording is returned to the depositor to serve as a receipt.

In one of its simplest embodiments the depository machine according to the present invention includes image recording means and validating means. Aperture means on the machine are adapted to receive sequentially from a depositor a deposit tag, and documents for storage. Feeding means are adapted to guide the tag and documents in received sequence from the aperture means to a collecting station. Validating means are disposed in the machine and are connected to sensing and control means, the latter coacting with the deposit tag and the validating means to cause validation of the tag subsequent to its receipt at the aperture means. The image recording means are so disposed as to view each of the received articles and are actuated to record an image of each of the documents and record also an image of the deposit tag subsequent to its validation.

In a further embodiment, the validated and recorded tag is returned to the depositor to serve as a receipt for the deposit.

Other embodiments and still further objects of this invention will be more clearly apparent and understood by referring to the following description and the accompanying drawings which form a part thereof.

Figure 2:
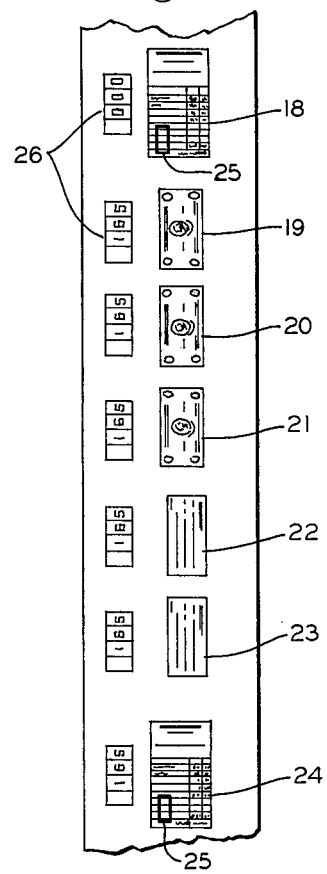
Figure 3:
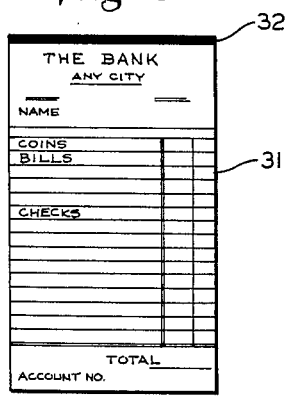
Figure 4:
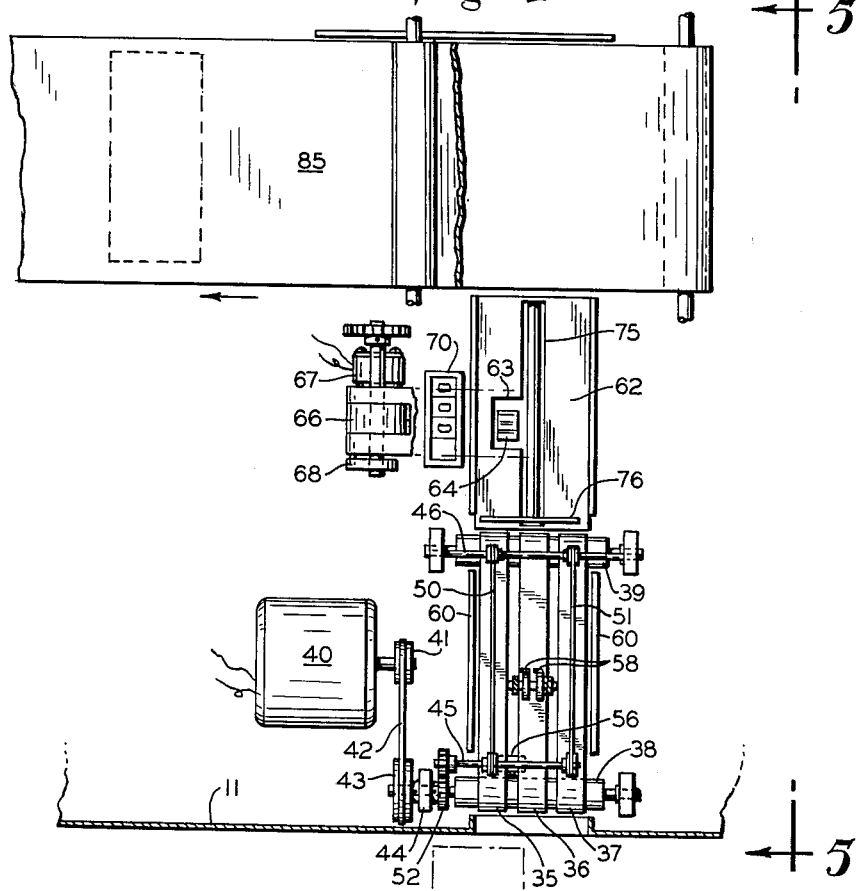
Figure 6:
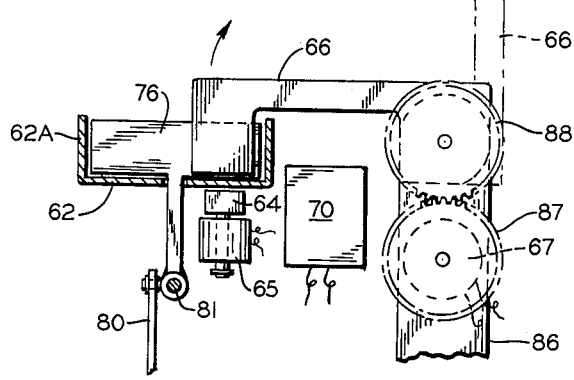

FIGURE 1 is a perspective view of the front of the machine showing the front, right side and top;
FIGURE 2 is a plan view of a typical film strip depicting the images associated with one deposit;
FIGURE 3 is a plan view of a typical deposit tag;
FIGURE 4 is a plan view along lines 4—4 in FIGURE 5, depicting the arrangement of certain elements within the machine;
FIGURE 5 is an elevational view, partly in section, along lines 5—5 in FIGURE 4;
FIGURE 6 is an elevational view of certain portions along lines 6—6 in FIGURE 5;
FIGURE 7 is a timing diagram of the machine, and
FIGURE 8 is a schematic electrical circuit diagram showing the electrical interconnections of the various mechanisms.

Referring now to the figures and FIGURE 1 in particular, numeral 11 identifies the front of the depository machine which is faced by a depositor when effecting a deposit. A deposit may comprise depositor prepared deposit tags on which are listed in itemized form all articles forming the deposit i.e., money bills, checks, and other suitable documents as well as the totalized amount of coin money to be deposited. Numeral 12 identifies an aperture means, preferably a slot which is adapted to receive in sequence the bills, checks, and other documents for image recording and deposit within the machine. A validated deposit tag which serves as a receipt can be returned to the depositor by means of an aperture 13, the latter leading from the inside of the machine to the front panel. Coins are separated by denomination and are inserted into respective slots at a coin totalizing means 14. An instruction plate 15 provides step-by-step direction in the use of the machine.

In one embodiment and in its preferred arrangement, the depositor is requested to prepare deposit tags in duplicate and arrange the items forming the deposit in such a way that the first item fed into the machine is a first deposit tag, followed sequentially by other documents such as money bills, checks, etc., and finally, a duplicate deposit tag which after validation is returned to the depositor to serve as a receipt. The second deposit tag thus denotes the end of the deposit.

FIGURE 2 shows a typical film strip portion which provides documentary evidence of the deposit. The first item 18 is the image of the original copy of the deposit tag properly filled out by the depositor, followed by three money bills 19, 20, and 21, which in turn are followed by two checks 22 and 23, and finally deposit tag 24 which is a copy of the original tag 18. It will be noted furthermore, that deposit tags 18 and 24 have been provided with a validation stamp 25 which marking has been affixed inside the machine and prior to rendering a documentary record on the film strip. Numeral 26 refers to an image of a display coming from the coin totalizing means mounted inside the machine, the display showing the total amount of coin money inserted at slots 14. Coin money may be inserted into the machine at any time during the period that a deposit of documents is effected. The deposit tag associated with image 24 subsequent to validation and recording an image thereof is returned to the depositor via aperture 13 to serve as a receipt. It will be noted that in this manner a deposit is recorded between a first and a second deposit tag, numerals 18 and 24 and thus, the beginning and end of a deposit may readily be established. The validation means may imprint selectively on the deposit tags bank number, seal, code, date and a serial number such as is well known in the art. Serializing of the deposit tags in particular will help to identify the location of the deposit images on the film.

A most important feature of this machine comprises the capability of discriminating between deposit tags and other documents, particularly money bills. This feature is accomplished by providing the deposit tags 31 with a narrow, electrically conductive strip 32 which is sensed by suitable sensing means in the machine and which in turn are connected to control means to actuate the validation means when a deposit tag passes underneath. Absence of the conductive strip denotes the passing of a document other than a deposit tag and the validation means remains inactive. The conductive strip may be affixed by using electrically conductive ink, deposit of electrically conductive graphite or the use of silver paint such as number 21-2 of the General Cement Mfg. Co., Rockford, Illinois. In an alternate manner, photoelectric sensing or scanning means in combination with a color code may be used or still further, coded apertures in conjunction with sensing switches, character recognition devices, et cetera are suitable, all of which are well known in the art of providing signals upon the passing of certain documents.

As shown in FIGURE 3 the electrically conductive strip is disposed at the leading edge of the deposit tag and as evident from FIGURE 2, in the depicted arrangement all documents are fed lengthwise. It will be apparent to those skilled in the art that the machine may readily be arranged to provide for the cross-wise feeding of documents without deviating from the intent and principle described hereinafter.

Referring now to FIGURES 4 and 5, aperture 12 at the front panel adapted to receive documents leads to a set of three endless transport belts 35, 36 and 37 which rotate about a set of pulleys 38 and 39. The shaft associated with pulley 38 is driven from an electric motor 40 via pulley 41, belt 42, pulley 43 and coupling 44. Above endless belts 35, 36 and 37, there is provided a set of transverse shafts 45 and 46 about which rotate by means of suitable pulleys, respective belts 50 and 51. These belts receive rotation via a set of gears 52 and thereby rotate in unison with the feed belts. Belts 51 and 50 are of comparatively narrow width and serve merely to hold a received document flat while the particular document is carrier along the surface of the belt. A further belt 55 is mounted underneath belts 35, 36 and 37 and is in frictional contact therewith. A document inserted between the returning portion of belts 35, 36 and 37, and the top portion of belt 55 is carried from the inside of the machine toward aperture 13. In this manner, return of the second deposit tag after its validation and recording is achieved. Switch 56 mounted underneath the top plane of belts 35-37 has an actuating arm which protrudes upward in the space between feed belts 35 and 36. Upon insertion of a document at aperture 12, this switch arm becomes actuated to cause energizing of motor 40 so as to transport the document into the machine. For the purpose of discerning whether the document received is a deposit tag or another kind of document, sensing means 58 are provided. This sensing means essentially comprises a pair of spaced, electrically conductive sensing wheels mounted on a fiber shaft. When conductive strip 32 passes underneath, continuity in an electrical circuit is established between both spaced wheels and this continuity in turn is sensed by an electrical control circuit which energizes the validation means for the purpose of affixing validation markings to the deposit tag just sensed.

A set of side plates 60 prevents documents from running off the feed belt in the event that such documents are inserted at the aperture means in a skewed manner.

To the rear of the feed belts there is disposed a stationary plate 62 which can be considered a platform. This platform is equipped with a rectangular, substantially centrally located cutout 63 through which a stamping head 64 operated by solenoid 65 may be raised. This stamping head when operating is opposed by a platen 66, normally standing upright, but adapted to be rotated by ninety degrees to come in contact with platform 62 by means of a rotary solenoid 67. A torsion spring 68 mounted between platen 66 and a stationary post causes the platen after having been lowered onto platform 62 to be returned to its normally vertical position.

In order to validate a receipt, platen 66 is momentarily lowered onto platform 62 and solenoid 65 is momentarily energized. The platen and the printing head may be considered the validation means. Validation means of this type are well known in the art and need not be described further. The printing head may be equipped with date notation, the words "deposited," bank number, and a serializing arrangement which advances by one digit after every second imprint. Such stamp means are available for instance from Wm. A. Force and Company, Brooklyn, N.Y., and Ajax Business Machines, Westbury, Long Island, N.Y.

Between platen 66 and the platform 62, FIGURE 4, there is disposed a display of the coin totalizer 70 which is connected to the slots 14 on the front panel. This device, too, is a commercial product and is included for instance, on the front panel of the "Mailomat" machine manufactured by Pitney-Bowes, Inc. of Stamford, Connecticut, and found in many lobbies of U.S. Post Offices. Upon insertion of coins into respective slots a display becomes visible which shows the totalized amount of the coin deposit.

An image recording means such as an electrically operated microfilm camera 71 is disposed to view any document disposed on platform 62 and view simultaneously also the display shown by the coin display means 70. In this manner, the camera provides a documentary record of the documents sequentially fed onto the platform in associated identifiable relation with a display of the totalized amount of the coins as best seen in FIGURE 2. Illuminating means 72 coact with the image recording means in the well known manner.

Referring still further to FIGURE 4 and to platform 62, it will be seen that the platform is provided with a lengthwise slot 75 in which there is disposed for reciprocatory motion a vane 76. Vane 76 has a lower extension 77, FIGURE 5, and is adapted to move toward the rear, that is, away from the feed belt by means of a solenoid 78, actuator 79, pivotally mounted linkage 80, and stationary shaft 81. A tension spring 82 biases the vane 76 toward its forward position, the position normally occupied when solenoid 78 is de-energized. It will be noted that the top edge of vane 76 is disposed below the height of the top portion of feed belt 37 (FIGURE 5) so that any document inserted at aperture 12 can come to rest on platform 62 without interference when vane 76 is located adjacent to the feed belts as depicted in FIGURE 5.

Toward the right of platform 62, FIGURE 5, there is indicated an enveloping, packaging and storage means as disclosed for instance, in my copending application for U.S. Letters Patent, Serial No. 782,177, entitled "Method and Apparatus for Compartmentizing and Storing Articles," filed December 22, 1958, now U.S. Patent No. 2,971,303 issued February 14, 1961. This mechanism essentially comprises two strips of paper, initially separated so as to receive therebetween a plurality of stacked documents. Subsequently the spaced strips are brought toward one another to enclose and retainingly hold the documents and finally, both strips are advanced in unison so that the stacked deposit is now held therebetween and separated from a succeeding deposit. It will be apparent to those skilled in the art that other packaging or container means may be used to receive and store a deposit or to receive and store one deposit separate from a succeeding and similar deposit.

In FIGURE 6, platen 66 is depicted when rotated to its lowered position to oppose printing head 64 which is urged into upward motion by solenoid 65. Platform 62 is equipped with upstanding sides 62A in order to prevent falling off of documents. Operation of platen 66 is achieved by means of rotary solenoid 67 which is mounted to a stationary post 86. Rotary action of the solenoid is transmitted to platen 66 by means of a set of gears 87 and 88. Platen 66 and gear 88 are fastened to one another and platen 66, too, is mounted for rotation about stationary post 86.

Operation of the instant depository machine may be visualized as follows. Normally motor 40 which imparts rotation to the feed belt is at rest. Upon inserting a document at aperture 12 the arm associated with switch 56 is actuated which in turn causes energizing of motor 40 and by means of a timing circuit keeps motor 40 running until the document inserted at aperture 12 traverses the feed belt and comes to rest on platform 62. Noting that vane 76 is in its normal position, this document and all succeeding ones except for the second deposit tag come to rest toward the rear of the vane. Motor 40 and the feeding mechanism are energized for every document which actuates switch 56. Additionally, timing means operate camera 71 and lights 72 when the document has reached platform 62 and is at rest thereupon.

It will be recalled tha a depositor using this machine is instructed that the first document fed be a deposit tag. As soon as the deposit tag actuates switch 56 the deposit tag is transported across the belt and deposited on platform 62. Additionally, sensing means 58 sense the conductive strip 32 and by means of control means and timing means associated therewith, actuate the validation means by energizing printing solenoid 65 and platen solenoid 67 immediately after the deposit tag comes to rest on the platform. Subsequent to validation, the platen resumes its normal position and the deposit tag now validated, presents an unobstructed view to camera 71 whereupon the camera is actuated to record an image of the deposit tag supplied by the depositor and validated by the machine.

Subsequent articles such as money bills and checks when fed in sequence do not actuate the sensing means 58 and come to rest, one on top of another, on platform 62. As each article reaches the platform and comes to rest, it is recorded as shown in FIGURE 2, but the validation means remain de-energized. When the second copy of the deposit tag is inserted at aperture 12 thereby signifying the end of the deposit, sensing means 58 sense the presence of a conductive strip. By means of a control circiut the second occurrence of a conductive strip is discerned and immediately solenoid 78 is energized thereby moving vane 76 toward the rear, thus pushing along in front thereof all previously stacked documents of the deposit, specifically the first deposit tag and subsequent money bills and checks. These items now are moved in unison onto the deposit storage means 85 and as a consequence thereof, platform 62 is temporarily empty. By means of a time delay cam, vane 76 is held temporarily toward the right, FIGURE 5, while the second deposit tag comes to rest on platform 62. As described in connection with the first deposit tag, solenoids 65 and 67 are energized to validate the deposit tag. When the tag is validated and platen 66 has returned to its vertical position, camera 71 is energized to provide a documentary record and immediately thereafter, solenoid 78 is de-energized causing the vane under the bias of spring 82 to return to its normal position. In returning vane 76 to its normal position, the second deposit tag is pushed between the return portion of belts 35, 36 and 37 and the top portion of belt 55, thus causing the validated and recorded copy of the deposit tag to be returned to the depositor to serve as a receipt for the deposited items.

By adjusting the validation means in such a manner that a change of numbers occurs after each second validating action, the deposited deposit tag and the returned deposit tag will carry identical numbers for ready identification and association.

FIGURE 7 is the timing diagram and shows the sequence of the various operations. Numeral 101 refers to the time required for a document to travel from aperture 12, via belts 35, 36 and 37 to rest on platform 62. After the document has come to rest on the platform, lights 72 are energized for a brief period of time, numeral 102, and camera 71 is triggered as is indicated by the bar associated with numeral 103.

When sensing means 58 establish the presence of a deposit tag and in the event that this tag is the second tag, control means energize solenoid 78 to move vane 76 toward the rear and thus remove all previously deposited documents from platform 62. Solenoid 78 remains energized during the time indicated by the block associated with numeral 104. It will be noted that this solenoid is actuated while the deposit tag still travels on the belt and remains activated until after the image recording means 71 has been operated.

Validation of the deposit tag is accomplished after the deposit tag comes to rest on platform 62, but prior to the actuation of the image recording means. Blocks 105 and 106 show the time during which the platen is lowered and the printing head is raised respectively. When releasing solenoid 78, motor 40 and associated transport belts are energized again in order to effect the return of the second deposit tag to the depositor, which time is represented by block 107. The second deposit tag is pushed by the return of vane 76 into the space between the lower portions of belts 35, 36 and 37 and upper portion of belt 55. It will be clearly understood that in the embodiment described heretofore, the energizing of solenoid 78, the associated movement of vane 76 and subsequent return to the depositor of the second, validated and recorded deposit tag occurs only upon the receipt of every second deposit tag which must be the last item of any given deposit.

In this manner the machine receives a deposit comprising a set of deposit tags and deposit items, all fed sequentially. Every item of the deposit is recorded by image recording means and additionally, the deposit tags are validated by the machine subsequent to receipt at the machine aperture. Finally, one of the deposit tags, duly validated and recorded is returned to the depositor to serve as a receipt. The remaining items forming the deposit, i.e. one deposit tag, checks, currency, etc., are retained and remain stored inaccessible to the depositor.

*Description of a Circuit Diagram, FIGURE 8*

Timing motor 140 is coupled to a series of timing means, cams 127, 128, 129 and drives via a gear reducer 141 a further timing cam 142. When the arm associated with sensing switch 56 is actuated, timing motor 140 is connected to a source of electric energy, numerals 125 and 126, to rotate the associated cams. Timing cam 127 with associated switch 130 causes the timing motor 140 to run for one complete revolution of cam 127 as switch 130 is connected in parallel with document switch 56.

As soon as motor 140 rotates, it drives via gear reducer 141 cam 142 which causes via switch 143 power to be applied to feed motor 40. In this way, the documents are fed across the transport belt. Cam 128 and associated switch 131 cause energizing of lights 72, and cam 129 and associated switch 132 cause actuation of the microfilm camera 71, all functions in sequence and in accordance with the timing diagram depicted in FIGURE 7.

When the sensing means 58 sense conductive strip 32 on the deposit tag, a circuit is established from source of electric energy 150 to amplifier 151 thereby causing a momentary pulse on relay 152 to close the associated contact. This action applies power to timing motor 160 which in turn drives a timing cam 161, cams 162 and 163, and via a two-to-one ratio gear reducer 165 cams 166 and 167. Timing cam 161 with its associated contact serves to bypass the contact associated with relay 152, thereby keeping the motor energized for a predetermined period of time. Cams 162 and 163 operate associated respective switches 170 and 172 to actuate platen solenoid 67 and printing head solenoid 65 respectively. The operation of these units is timed with the feed motor and camera as shown in FIGURE 6.

It will be observed that cams 166 and 167 are driven at half the speed so that they resume their normal position after every second actuation of motor 160. In this manner cams 166 and 167 are phased in with the occurrence of every second deposit tag. Solenoid 78 is energized via switch 180 during the second cycle of rotation of motor 160. When vane 76 returns to its normal position, feed motor 40 must be restarted in order to return to the depositor the second deposit tag which serves as a receipt. This restarting of the drive motor is accomplished by means of cam 167 and switch 181, the latter being connected in parallel with switch 56.

It may be noted that by virtue of the arrangement described hereinabove, motor 140 goes through a second cycle of operation when the second deposit tag is returned to the depositor and thus, the camera is triggered again although no document is present on platform 62. This action will result in an empty frame which may be utilized as a dividing means. In the event that this blank frame in the interest of economy is to be eliminated, simple circuit means can be provided to disable the lights and camera for this duration.

As a very important feature, it should be noted further that actuation of the validation means, solenoid 78, and starting of the feed motor 40 for effecting return of the second deposit tag occurs only upon the sensing means 58 sensing a conductive strip 32. In the absence of a deposit tag, only feed motor 40, the camera and the illuminating means are activated.

Whereas the above arrangement comprises the preferred embodiment, it shall be clearly understood by those skilled in the art that several modifications may be made without deviating from the principle of the invention. A typical such modification comprises the use of only a single deposit tag which after validation and photography is returned to the depositor. In this manner the bank receives no deposit tag for filing, but will credit the proper account by inspection of the microfilm itself. When the bank does not desire the retention of a deposit tag, the two-to-one ratio gear reducer 165 is eliminated so that any deposit tag is returned after validation and recording. The deposit tag preferably occupies either the first or last position in a deposit.

A further modification compirses the use of a validation apparatus disposed outside the machine which is used to imprint one or two deposit tags with serializing indicia. These valdation means may be used to render the machine operative, suitable acknowledgment stamping means will be retained however, in the machine in order to return an acknowledged deposit tag to the depositor.

Additionally, if desired, it will be helpful to provide a further coin counting and totalizing means in conjunction with a printing recorder so as to print on tape a running accout of all coins deposited in the machine.

Finally, when the documents inserted into the machine, particularly such documents as checks, deposit tag or tags, and such further articles as stubs, invoices, etc., differ in physical size from conventional money bills, document measuring means can be used for discriminating between money bills and all other articles. In this manner, the validating or stamping means will be actuated for all articles other than money bills to denote acceptance or validation. As is well known, no such notation may be applied to currency and as a consequence thereof, the validating and stamping means will remain idle during acceptance of money bills as determined by the document measuring means.

While there has been described and illustrated a certain and preferred embodiment of the invention and several variations and modifications thereof, it will be readily apparent to those skilled in the art that various further and still other modifications and changes may be made therein without deviating from the spirit and intent of the present invention which shall be limited only by the scope of the appended claims.

What is claimed is:

1. In a depository machine which includes image recording means and validating means, and which is adapted to accept and feed sequentially articles such as a pair of deposit tags and documents, the combination of: an enclosure; aperture means on said enclosure adapted to receive from a depositor said deposit tags and documents; feeding means adapted to guide said tags and documents in sequence from said aperture means into the enclosure whereby the fed articles are rendered inaccessible to the depositor; validating means disposed in the enclosure and when actuated adapted to engage each of said tags for causing validation thereof; sensing and control means connected to said validating means and being disposed for sensing said tags subsequent to the receipt thereof by said aperture means; said sensing and control means upon sensing said deposit tags actuating said validating means to cause validating of each tag; said image recording means disposed to view the articles received at said aperture means; control means connected to the image recording means and actuating said image recording means in response to the receipt of the articles to record an image of each of said received documents and an image of said tags subsequent to the validation thereof; means feeding said documents and one of said validated and recorded tags subsequent to recording an image of each to storage means which are disposed inaccessible to the depositor, and further means for returning to a position accessible to the depositor the other validated and recorded tag whereby the latter tag serves as a receipt for the recorded and stored documents.

2. In a depository machine which includes image recording means and validating means, and which is adapted to accept and feed sequentially articles such as deposit tags and documents, the combination of: aperture means on said machine adapted to receive sequentially from a depositor a first deposit tag, documents for storage, and a second deposit tag; feeding means adapted to guide said tags and documents in sequence from said aperture means to a collecting station disposed within said machine; validating means disposed in the machine and when actuated adapted to engage each of said tags for causing validation thereof; sensing and control means connected to said validating means and being disposed for sensing said tags subsequent to the receipt thereof by said aperture means; said sensing and control means upon sensing said deposit tags actuating said validating means to cause validating of each tag; said image recording means disposed to view the articles received at said aperture means; control means connected to the image recording means and actuating said image recording means in response to the receipt of the articles to record an image of each of said received documents and an image of said tags subsequent to the validation thereof; means feeding said recorded documents and one of said validated and recorded tags from said collecting station to storage means, and further means for rendering available to the depositor the other validated and recorded tag whereby the latter tag serves as a receipt for the recorded and stored documents.

3. In a depository machine which includes image recording means and validating means, and which is adapted to accept and feed sequentially articles such as deposit tags and documents, the combination of: aperture means on said machine adapted to receive sequentially from a depositor a first deposit tag, documents for storage, and a second deposit tag; feeding means adapted to guide said tags and documents in received sequence from said aperture means to a collecting station disposed within said machine; validating means disposed in the machine and when actuated adapted to engage each of said tags for causing validation thereof; sensing and control means connected to said validating means and being disposed for sensing said tags subsequent to the receipt thereof by said aperture means; said sensing and control means causing operation of said validating means in response to sensing said deposit tags whereby effecting validation of each tag and said sensing and control means causing said validating means to remain idle when sensing other documents to prevent validating of other documents received at said aperture means; said image recording means disposed to view the articles received at said aperture means; control means connected to the image recording means and actuating said image recording means in response to the receipt of the articles to record an image of each of said received documents and an image of said tags subsequent to the validation thereof; means feeding said recorded documents and one of said validated and recorded tags from said collecting station to storage means, and further means for rendering available to the depositor the other validated and recorded tag whereby the latter tag serves as a receipt for the recorded and stored documents.

4. In a depository machine which includes image recording means and validating means, sensing and control means, and which is adapted to accept and feed sequentially articles such as deposit tags and documents, the combination of: aperture means on said machine adapted to receive sequentially from a depositor a set of deposit tags, and documents for storage; feeding means adapted to guide said tags and documents in sequence from said aperture means to a collecting station; validating means disposed in the machine and adapted to be actuated responsive to a signal from said sensing and control means; said deposit tags provided with means adapted to be sensed by said sensing and control means whereby the latter produces a signal for causing said validating means to validate said received tags by affixing thereto validation marks; said image recording means disposed to view the articles received at said aperture means; means causing operation of said recording means for recording sequentially an image of each of said documents and of said tags with validation marks affixed thereto; means feeding said recorded documents and one of said validated and recorded tags from said collecting station to storage means, and further means causing the other validated and recorded tag to be rendered available to the depositor whereby the latter tag serves as a receipt for the recorded and stored documents.

5. In a depository machine which includes image recording means and validating means, sensing and control means, and which is adapted to accept articles such as deposit tags, documents and coins, the combination of: aperture means on said machine adapted to receive from a depositor coins, a set of deposit tags, and documents for storage: coin counting means adapted to receive said coins and displaying indicia responsive to the coins deposited; feeding means adapted to guide said tags and documents in sequence from said aperture means to a collecting station; validating means disposed in the machine; said deposit tags provided with means adapted to be sensed by said sensing and control means to cause said validating means to validate said received tags by affixing thereto validation marks; said image recording means disposed to view said coin responsive indicia and consecutively the tags and documents received at said aperture means; means causing operation of said recording means whereby to record sequentially an image of each of said documents, an image of said tags and the validation marks affixed thereto and an image of said coin responsive indicia; means feeding said recorded documents and one of said validated and recorded tags from said collecting station to storage means, and further means causing the other validated and recorded tag to be rendered available to the depositor whereby the latter tag serves as a receipt for the recorded and stored documents.

6. In a depository machine which includes image recording means and validating means, sensing and control means, and which is adapted to accept and feed sequentially articles such as deposit tags and documents, the combination of: aperture means on said machine adapted to receive sequentially from a depositor a set of deposit tags, and documents for storage; feeding means adapted to guide one of said tags and documents in sequence from said aperture means for assemblage to a collecting station; validating means disposed in the machine; said deposit tags provided with means adapted to be sensed by said sensing and control means whereby to cause said validating means to validate said received tags by affixing thereto validation marks; said image recording means disposed to view the articles received at said aperture means; control means operated in response to the receipt of said articles for causing said recording means to record sequentially an image of each of said documents and record also an image of said tags; means feeding said assembled and recorded documents and one of said validated and recorded tags from said collecting station to storage means, and further means causing the other validated and recorded tag to be rendered available to the depositor whereby the latter tag serves as a receipt for the recorded and stored documents.

7. In a depository machine which includes image recording means and validating means, sensing and control means, and which is adapted to accept and feed sequentially articles such as deposit tags and documents, the combination of: aperture means on said machine adapted to receive sequentially from a depositor documents for storage and at least one deposit tag; feeding means adapted to guide said documents and tag in sequence from said aperture means to a collecting platform; validating means adapted to engage said tag in response to the receipt thereof by said aperture means disposed in the machine; means actuating said validating means whereby to cause validation of said tag; said image recording means disposed to view each of the articles received at said aperture means; means actuating said recording means in response to the receipt of said articles for recording sequentially an image of each of said documents and of said tag; movable means coacting with said platform and when set in motion adapted to remove articles therefrom; control means coupled to said movable means for alternately causing said movable means to move in a first direction whereby recorded documents on said platform are moved therefrom to storage means and to move in a second direction whereby said deposit tag is removed from said platform to feeding means, and said latter feeding means causing said validated and recorded tag to be rendered available to the depositor to serve as a receipt for the documents.

8. In a depository machine which includes image recording means and validating means, sensing and control means, and which is adapted to accept and feed sequentially articles such as deposit tags and documents, the combination of: aperture means on said machine adapted to receive sequentially from a depositor a first deposit tag, documents for storage and a second deposit tag; feeding means adapted to guide one of said tags and documents in sequence from said aperture means for assemblage to a collecting platform and guiding also said second tag to the platform for subsequent return to the depositor; validating means adapted to engage said tags disposed in the machine; means adapted to sense the received tags and actuating said validating means whereby to cause validation of said tags; said image recording means disposed to view each of the articles received at said aperture means; means actuating said recording means in response to the receipt of said articles for recording sequentially an image of each of said documents and of said tags; movable means coacting with said platform and when set in reciprocatory motion adapted to remove articles therefrom; control means coupled to said movable means for alternately causing said movable means to move in a first direction whereby the assembled and recorded documents and said one validated and recorded tag disposed on said platform are moved therefrom to storage means and to move in a second direction whereby said second validated and recorded deposit tag is removed from said platform to feeding means, and said latter feeding means causing said latter tag to be rendered available to the depositor to serve as a receipt for the documents.

9. In a depository machine which includes image recording means and validating means, sensing and control means, and which is adapted to accept and feed sequentially articles such as deposit tags and documents, the combination of: aperture means on said machine adapted to receive sequentially from a depositor a first deposit tag and documents for storage; feeding means adapted to guide said tag and documents in sequence from said aperture means to a collecting platform for assemblage thereon; validating means disposed at said collecting platform adapted to engage said tag when said tag is disposed at said platform; sensing means adapted to sense the received tag and cause actuation of said validating means whereby to affix validation marks to said tag; said image recording means disposed to view each of the articles received on said platform; control means connected to said recording means and sequentially actuating said recording means as the validated tag and each document becomes disposed on said platform whereby to record an image of said validated tag and of each of said documents; movable means coacting with said platform and said movable means when set in motion adapted to remove articles from said platform; further control means coupled to said movable means and actuated in response to the receipt of a second deposit tag at said aperture means whereby said movable means move in a first direction to cause the assembled and recorded documents and validated first tag to be moved from said platform to storage means while said second tag is guided by said feeding means toward said platform; said sensing and control means causing also actuation of said validating and recording means when said second tag is disposed on said platform whereby to cause validation and image recording thereof; said further control means subsequently causing said movable means to move in a second direction whereby said second tag is removed from said platform to feeding means, and said latter feeding means causing said second tag to be rendered available to the depositor to serve as a receipt for the documents moved to said storage means.

10. In a depository machine as set forth in claim 9 wherein said feeding means comprise a set of juxtaposed endless belts rotating about rollers; said belts being adapted to guide documents from said aperture means to said platform and guiding also the second deposit tag subsequent to its validation from the platform to a position at which the tag is available to the depositor.

11. In a depository machine which includes image recording means and validating means, sensing and control means, and which is adapted to accept and feed sequentially articles constituting a deposit, such as deposit tags and documents, the combination of: aperture means on said machine adapted to receive sequentially from a depositor a first deposit tag and documents for storage, said tag being provided with electrical circuit actuating means; feeding means adapted to guide said tag and documents in sequence from said aperture means to a collecting platform for assemblage thereon; validating means disposed at said collecting platform adapted to engage said tag when said tag is disposed at said platform; sensing means adapted to sense the circuit actuating means of the received tag and cause actuation of said validating means whereby to affix validation marks to said tag; said image recording means disposed to view each of the articles received on said platform; control means connected to said recording means and sequentially actuating said recording means as the validated tag and each document becomes disposed on said platform whereby to record an image of said validated tag and of each of said documents; movable means coacting with said platform and said movable means when set in motion adapted to remove articles from said platform; further control means coupled to said movable means and actuated in response to the receipt of a second deposit tag at said aperture means which second tag constitutes the last article of the respective deposit whereby said movable means move in a first direction to cause the assembled and recorded documents and validated first tag to be moved as a unitary deposit from said platform to storage means while said second tag is guided by said feeding means toward said platform; said second deposit tag being provided also with electrical circuit actuating means for causing operation of said validating means, and said control means actuating said recording means to provide validation and image recording of said second tag when the latter is disposed on said platform; said further control means subsequently causing said movable means to move in a second direction whereby said second tag is removed from said platform to feeding means, and said latter feeding means causing said second tag to be rendered available to the depositor to serve as a receipt for the documents moved to said storage means.

12. In a depository machine which includes image recording means and which is adapted to accept and feed sequentially articles such as deposit tags and documents, the combination of: an enclosure; aperture means on said documents and one of said validated and recorded tags subsequent to recording an image of each to storage means which are disposed inaccessible to the depositor, and further means for returning to a position accessible to the depositor the other validated and recorded tag whereby the latter tag serves as a receipt for the recorded and stored documents.

2. In a depository machine which includes image recording means and validating means, and which is adapted to accept and feed sequentially articles such as deposit tags and documents, the combination of: aperture means on said machine adapted to receive sequentially from a depositor a first deposit tag, documents for storage, and a second deposit tag; feeding means adapted to guide said tags and documents in sequence from said aperture means to a collecting station disposed within said machine; validating means disposed in the machine and when actuated adapted to engage each of said tags for causing validation thereof; sensing and control means connected to said validating means and being disposed for sensing said tags subsequent to the receipt thereof by said aperture means; said sensing and control means upon sensing said deposit tags actuating said validating means to cause validating of each tag; said image recording means disposed to view the articles received at said aperture means; control means connected to the image recording means and actuating said image recording means in response to the receipt of the articles to record an image of each of said received documents and an image of said tags subsequent to the validation thereof; means feeding said recorded documents and one of said validated and recorded tags from said collecting station to storage means, and further means for rendering available to the depositor the other validated and recorded tag whereby the latter tag serves as a receipt for the recorded and stored documents.

3. In a depository machine which includes image recording means and validating means, and which is adapted to accept and feed sequentially articles such as deposit tags and documents, the combination of: aperture means on said machine adapted to receive sequentially from a depositor a first deposit tag, documents for storage, and a second deposit tag; feeding means adapted to guide said tags and documents in received sequence from said aperture means to a collecting station disposed within said machine; validating means disposed in the machine and when actuated adapted to engage each of said tags for causing validation thereof; sensing and control means connected to said validating means and being disposed for sensing said tags subsequent to the receipt thereof by said aperture means; said sensing and control means causing operation of said validating means in response to sensing said deposit tags whereby effecting validation of each tag and said sensing and control means causing said validating means to remain idle when sensing other documents to prevent validating of other documents received at said aperture means; said image recording means disposed to view the articles received at said aperture means; control means connected to the image recording means and actuating said image recording means in response to the receipt of the articles to record an image of each of said received documents and an image of said tags subsequent to the validation thereof; means feeding said recorded documents and one of said validated and recorded tags from said collecting station to storage means, and further means for rendering available to the depositor the other validated and recorded tag whereby the latter tag serves as a receipt for the recorded and stored documents.

4. In a depository machine which includes image recording means and validating means, sensing and control means, and which is adapted to accept and feed sequentially articles such as deposit tags and documents, the combination of: aperture means on said machine adapted to receive sequentially from a depositor a set of deposit tags, and documents for storage; feeding means adapted to guide said tags and documents in sequence from said aperture means to a collecting station; validating means disposed in the machine and adapted to be actuated responsive to a signal from said sensing and control means; said deposit tags provided with means adapted to be sensed by said sensing and control means whereby the latter produces a signal for causing said validating means to validate said received tags by affixing thereto validation marks; said image recording means disposed to view the articles received at said aperture means; means causing operation of said recording means for recording sequentially an image of each of said documents and of said tags with validation marks affixed thereto; means feeding said recorded documents and one of said validated and recorded tags from said collecting station to storage means, and further means causing the other validated and recorded tag to be rendered available to the depositor whereby the latter tag serves as a receipt for the recorded and stored documents.

5. In a depository machine which includes image recording means and validating means, sensing and control means, and which is adapted to accept articles such as deposit tags, documents and coins, the combination of: aperture means on said machine adapted to receive from a depositor coins, a set of deposit tags, and documents for storage; coin counting means adapted to receive said coins and displaying indicia responsive to the coins deposited; feeding means adapted to guide said tags and documents in sequence from said aperture means to a collecting station; validating means disposed in the machine; said deposit tags provided with means adapted to be sensed by said sensing and control means to cause said validating means to validate said received tags by affixing thereto validation marks; said image recording means disposed to view said coin responsive indicia and consecutively the tags and documents received at said aperture means; means causing operation of said recording means whereby to record sequentially an image of each of said documents, an image of said tags and the validation marks affixed thereto and an image of said coin responsive indicia; means feeding said recorded documents and one of said validated and recorded tags from said collecting station to storage means, and further means causing the other validated and recorded tag to be rendered available to the depositor whereby the latter tag serves as a receipt for the recorded and stored documents.

6. In a depository machine which includes image recording means and validating means, sensing and control means, and which is adapted to accept and feed sequentially articles such as deposit tags and documents, the combination of: aperture means on said machine adapted to receive sequentially from a depositor a set of deposit tags, and documents for storage; feeding means adapted to guide one of said tags and documents in sequence from said aperture means for assemblage to a collecting station; validating means disposed in the machine; said deposit tags provided with means adapted to be sensed by said sensing and control means whereby to cause said validating means to validate said received tags by affixing thereto validation marks; said image recording means disposed to view the articles received at said aperture means; control means operated in response to the receipt of said articles for causing said recording means to record sequentially an image of each of said documents and record also an image of said tags; means feeding said assembled and recorded documents and one of said validated and recorded tags from said collecting station to storage means, and further means causing the other validated and recorded tag to be rendered available to the depositor whereby the latter tag serves as a receipt for the recorded and stored documents.

7. In a depository machine which includes image recording means and validating means, sensing and control means, and which is adapted to accept and feed sequentially articles such as deposit tags and documents, the combination of: aperture means on said machine adapted to receive sequentially from a depositor documents for storage and at least one deposit tag; feeding means adapted to guide said documents and tag in sequence from said aperture means to a collecting platform; validating means adapted to engage said tag in response to the receipt thereof by said aperture means disposed in the machine; means actuating said validating means whereby to cause validation of said tag; said image recording means disposed to view each of the articles received at said aperture means; means actuating said recording means in response to the receipt of said articles for recording sequentially an image of each of said documents and of said tag; movable means coacting with said platform and when set in motion adapted to remove articles therefrom; control means coupled to said movable means for alternately causing said movable means to move in a first direction whereby recorded documents on said platform are moved therefrom to storage means and to move in a second direction whereby said deposit tag is removed from said platform to feeding means, and said latter feeding means causing said validated and recorded tag to be rendered available to the depositor to serve as a receipt for the documents.

8. In a depository machine which includes image recording means and validating means, sensing and control means, and which is adapted to accept and feed sequentially articles such as deposit tags and documents, the combination of: aperture means on said machine adapted to receive sequentially from a depositor a first deposit tag, documents for storage and a second deposit tag; feeding means adapted to guide one of said tags and documents in sequence from said aperture means for assemblage to a collecting platform and guiding also said second tag to the platform for subsequent return to the depositor; validating means adapted to engage said tags disposed in the machine; means adapted to sense the received tags and actuating said validating means whereby to cause validation of said tags; said image recording means disposed to view each of the articles received at said aperture means; means actuating said recording means in response to the receipt of said articles for recording sequentially an image of each of said documents and of said tags; movable means coacting with said platform and when set in reciprocatory motion adapted to remove articles therefrom; control means coupled to said movable means for alternately causing said movable means to move in a first direction whereby the assembled and recorded documents and said one validated and recorded tag disposed on said platform are moved therefrom to storage means and to move in a second direction whereby said second validated and recorded deposit tag is removed from said platform to feeding means, and said latter feeding means causing said latter tag to be rendered available to the depositor to serve as a receipt for the documents.

9. In a depository machine which includes image recording means and validating means, sensing and control means, and which is adapted to accept and feed sequentially articles such as deposit tags and documents, the combination of: aperture means on said machine adapted to receive sequentially from a depositor a first deposit tag and documents for storage; feeding means adapted to guide said tag and documents in sequence from said aperture means to a collecting platform for assemblage thereon; validating means disposed at said collecting platform adapted to engage said tag when said tag is disposed at said platform; sensing means adapted to sense the received tag and cause actuation of said validating means whereby to affix validation marks to said tag; said image recording means disposed to view each of the articles received on said platform; control means connected to said recording means and sequentially actuating said recording means as the validated tag and each document becomes disposed on said platform whereby to record an image of said validated tag and of each of said documents; movable means coacting with said platform and said movable means when set in motion adapted to remove articles from said platform; further control means coupled to said movable means and actuated in response to the receipt of a second deposit tag at said aperture means whereby said movable means move in a first direction to cause the assembled and recorded documents and validated first tag to be moved from said platform to storage means while said second tag is guided by said feeding means toward said platform; said sensing and control means causing also actuation of said validating and recording means when said second tag is disposed on said platform whereby to cause validation and image recording thereof; said further control means subsequently causing said movable means to move in a second direction whereby said second tag is removed from said platform to feeding means, and said latter feeding means causing said second tag to be rendered available to the depositor to serve as a receipt for the documents moved to said storage means.

10. In a depository machine as set forth in claim 9 wherein said feeding means comprise a set of juxtaposed endless belts rotating about rollers; said belts being adapted to guide documents from said aperture means to said platform and guiding also the second deposit tag subsequent to its validation from the platform to a position at which the tag is available to the depositor.

11. In a depository machine which includes image recording means and validating means, sensing and control means, and which is adapted to accept and feed sequentially articles constituting a deposit, such as deposit tags and documents, the combination of: aperture means on said machine adapted to receive sequentially from a depositor a first deposit tag and documents for storage, said tag being provided with electrical circuit actuating means; feeding means adapted to guide said tag and documents in sequence from said aperture means to a collecting platform for assemblage thereon; validating means disposed at said collecting platform adapted to engage said tag when said tag is disposed at said platform; sensing means adapted to sense the circuit actuating means of the received tag and cause actuation of said validating means whereby to affix validation marks to said tag; said image recording means disposed to view each of the articles received on said platform; control means connected to said recording means and sequentially actuating said recording means as the validated tag and each document becomes disposed on said platform whereby to record an image of said validated tag and of each of said documents; movable means coacting with said platform and said movable means when set in motion adapted to remove articles from said platform; further control means coupled to said movable means and actuated in response to the receipt of a second deposit tag at said aperture means which second tag constitutes the last article of the respective deposit whereby said movable means move in a first direction to cause the assembled and recorded documents and validated first tag to be moved as a unitary deposit from said platform to storage means while said second tag is guided by said feeding means toward said platform; said second deposit tag being provided also with electrical circuit actuating means for causing operation of said validating means, and said control means actuating said recording means to provide validation and image recording of said second tag when the latter is disposed on said platform; said further control means subsequently causing said movable means to move in a second direction whereby said second tag is removed from said platform to feeding means, and said latter feeding means causing said second tag to be rendered available to the depositor to serve as a receipt for the documents moved to said storage means.

12. In a depository machine which includes image recording means and which is adapted to accept and feed sequentially articles such as deposit tags and documents, the combination of: an enclosure; aperture means on said enclosure for receiving a plurality of individual and detached documents in the form of a deposit tag, individual checks, various paper currency documents and the like; feeding means in said enclosure; said feeding means adapted to receive said documents at said aperture means and feed each of said documents sequentially and separately to a recording station whereby the documents are no longer accessible to a depositor feeding said documents at said aperture means; image recording means disposed at said recording station for sequentially recording an image of each of said documents; validating means disposed in the enclosure and adapted to engage the deposit tag received at said aperture means; control means connected to the validating means and to said image recording means and actuated in response to the receipt of said articles at said aperture means whereby to cause said validating means to validate said tag by affixing indicia thereupon and causing actuation of said image recording means for providing an image of each of said documents and of said tag, and means subsequently returning said validated and recorded tag to a position which is accessible from the exterior of the enclosure while retaining said other documents inaccessible to the depositor.

References Cited in the file of this patent

UNITED STATES PATENTS

| | | |
|---|---|---|
| 1,259,399 | Hipwell | Mar. 12, 1918 |
| 2,923,587 | Zipf | Feb. 2, 1960 |
| 2,963,333 | Mestre | Dec. 6, 1960 |